(12) United States Patent
Kokeguchi (10) Patent No.: US 7,864,407 B2
(45) Date of Patent: Jan. 4, 2011

(54) DISPLAY ELEMENT

(75) Inventor: Noriyuki Kokeguchi, Kokubunji (JP)

(73) Assignee: Konica Minolta Holdings, Inc. (JP)

( * ) Notice: Subject to any disclaimer, the term of this patent is extended or adjusted under 35 U.S.C. 154(b) by 747 days.

(21) Appl. No.: 11/883,395

(22) PCT Filed: Jan. 13, 2006

(86) PCT No.: PCT/JP2006/300331

§ 371 (c)(1),
(2), (4) Date: Jul. 31, 2007

(87) PCT Pub. No.: WO2006/082700

PCT Pub. Date: Aug. 10, 2006

(65) Prior Publication Data

US 2008/0166590 A1 Jul. 10, 2008

(30) Foreign Application Priority Data

Feb. 4, 2005 (JP) ............................. 2005-028672

(51) Int. Cl.
*G02B 26/00* (2006.01)
(52) U.S. Cl. ..................... 359/297; 359/290
(58) Field of Classification Search ......... 359/296–297, 359/265; 252/299.1, 299.61, 299.01; 345/173, 345/94; 349/143, 41
See application file for complete search history.

(56) References Cited

U.S. PATENT DOCUMENTS 4,240,717 A * 12/1980 Camlibel et al. ............. 359/297
5,378,594 A * 1/1995 Okazaki et al. ............. 430/545

FOREIGN PATENT DOCUMENTS

| JP | 9-297325 | 11/1997 |
| JP | 3-428603 | 5/2003 |
| JP | 2003-241227 | 8/2003 |
| JP | 2004-4267 | 1/2004 |
| JP | 2004-177491 | 6/2004 |
| JP | 2004-191838 | 7/2004 |
| JP | 2004-191838 A | 7/2004 |
| JP | 2004-286884 | 10/2004 |
| JP | 2004-309946 | 11/2004 |

OTHER PUBLICATIONS

Supplementary European Search Report for Application No. 06702609.6-1228/1845409 PCT/JP2006300331 dated Jan. 31, 2009.
International Search Report for International Application No. PCT/JP2006/300331 mailed Feb. 7, 2006.

* cited by examiner

*Primary Examiner*—Jessica T Stultz
*Assistant Examiner*—Mahidere S Sahle
(74) *Attorney, Agent, or Firm*—Cantor Colburn LLP (57) ABSTRACT

A display element which has an electrolyte layer containing silver or a compound containing silver in the chemical structure thereof and an electrolytic solvent between opposed electrodes, and also contains a porous white scattering material between said opposed electrodes, wherein said opposed electrodes can be operated so as to dissolve silver or deposit silver, characterized in that said porous white scattering material is incorporated through a step of imparting an aqueous intimate mixture containing a water-soluble polymer substantially insoluble in said electrolytic solvent and a white pigment onto a component between said opposed electrodes, followed by drying. The above display element is composed of simple and easily available members, can be operated with a low voltage, exhibits high display contrast and satisfactorily high reflectance for the white display, and is reduced in the fluctuation of the white reflectance.

6 Claims, 1 Drawing Sheet

FIG. 1

DISPLAY ELEMENT

CROSS REFERENCE TO RELATED APPLICATIONS

This is a U.S. national stage of application No. PCT/JP2006/300331, filed on 13 Jan. 2006. Priority under 35 U.S.C. §119(a) and 35 U.S.C. §365(b) is claimed from Japanese Application No. 2005-028672, filed 4 Feb. 2005, the disclosure of which is also incorporated herein by reference.

TECHNICAL FIELD

The present invention relates to an electrochemical display element utilizing dissolution and deposition of silver.

BACKGROUND OF THE INVENTION

In recent years, along with the increase in the operating speed of personal computers, the spread of network infrastructure, the markedly increased capacity of data storage, and the decrease in price, a further opportunity is increasing in which information such as text and images which have traditionally been supplied in the form of paper printed matter is now acquired and read as convenient electronic information.

Employed as such electronic information reading means are conventional liquid crystal displays as well as CRTs, and in recent years, emissive displays such as organic EL displays are drawn attention. Particularly, when electronic information is in the form of text, it is necessary for an operator to watch the browsing means for a relatively long period of time, which is not a human-conscious operation. Generally, it is known that emissive displays exhibit the following disadvantages: screen flickering results in eye fatigue; display devices are not portable; reading posture is limited; operators tend to gaze at a still screen; and reading over an extended period of time results in an increase of electric power consumption.

Known as display means to overcome such disadvantages are reflective displays (having a memory function) which do not consume power for maintaining images since these displays use external light. However, due to the following reasons, it is difficult to mention that sufficient performance is achieved.

Namely, displays employing polarized plates such as reflective liquid crystals exhibit reflectance as low as approximately 40 percent, resulting in having a problem in displaying white. Further, the production methods employed to prepare constituting members are not simple. Polymer dispersion type liquid crystal displays require relatively high voltage, in addition, since only the difference in the refractive index among organic materials is utilized, the resulting images do not exhibit sufficient contrast. Polymer network type liquid crystal displays result in problems in which a high voltage is required and in order to enhance memory functions, complicated TFE circuits are required. Display elements based on an electrophoretic method necessitate voltage as high as at least 10 V, and durability problems may occur due to coagulation of electrophoretic particles. Electrochromic display elements can be driven at as low as 3 V, however, color qualities of black and other colors (for example, yellow, magenta, cyan, blue, green, and red) are not sufficient, and in addition, in order to keep the memory function of the display, complicated display constitution may be needed, for example, a constituting layer prepared by an evaporation technique.

Known as a display system which overcomes many of the above mentioned problems is an electrodeposition display (hereinafter referred to as ED) utilizing dissolution and deposition of metals or metal salts. The ED display exhibits advantages such that it is possible to drive the ED system at a voltage below 3 V, the cell structure is simple, the contrast between black and white, as well as the quality of black are excellent. Various methods on ED displays have been disclosed (refer, for example, to Patent Documents 1-3).

The present inventor has examined in detail the prior art disclosed in each of the above Patent Documents and have found that, in the prior art, when a white pigment is incorporated in the electrolyte liquid, the dispersion of the white pigment is not fully stable, and the reflectance of white display varies with time, or when non-woven cloth of filter paper is used as a white scattering material, the difference in refractive index from that of the organic material is too small, resulting in obtaining insufficient reflectance of white display. Thus the present invention was motivated.

(Patent Document 1) U.S. Pat. No. 4,240,716

(Patent Document 2) Japanese Patent Publication No. 3428603

(Patent Document 3) Japanese Patent Application Publication Open to Public Inspection (hereinafter referred to as JP-A) No. 2003-241227

DISCLOSURE OF THE INVENTION

Subject to be Solved by the Invention

The present invention has been made in light of the foregoing circumstances. An object of the present invention is to provide a display element having a simple display construction and exhibiting a low drive voltage, a high display contrast, a sufficiently high reflectance of white display and a small variation of the reflectance of white display.

Means for Solving the Problems

The above object of the present invention is achieved by the following structures.

(1) A display element comprising opposed electrodes having therebetween:

an electrolyte layer comprising an electrolyte solvent, and silver or a compound comprising silver in the chemical structure; and a porous-white scattering material, the display element being driven by a driving operation so as to dissolve silver or to deposit silver by using the opposed electrodes, wherein the porous-white scattering material is incorporated between the opposed electrode by the following method comprising the steps of:

applying an aqueous mixture on a constituting member incorporated between the opposed electrodes; and drying the aqueous mixture, the aqueous mixture comprising a white pigment and a water-soluble polymer being substantially insoluble in the electrolyte solvent.

(2) The display element of Item (1), wherein the water-soluble polymer is gelatin, a gelatin derivative, polyvinyl alcohol or a polyvinyl alcohol derivative.

(3) The display element of Item (1) or (2), wherein a hardening reaction of the water-soluble polymer is carried out using a hardening agent during or after the step of drying the aqueous mixture.

(4) The display element of any one of Items (1) to (3), wherein the electrolyte layer comprises at least one compound represented by Formula (1) or Formula (2) and at least one compound represented by Formula (3) or Formula (4):

Formula (1)

wherein L represents an oxygen atom or $CH_2$, $R_1$-$R_4$ each represent a hydrogen atom, an alkyl group, an alkenyl group, an aryl group, a cycloalkyl group, an alkoxyalkyl group or an alkoxy group,

Formula (2)

wherein $R_5$ and $R_6$ each represent a hydrogen atom, an alkyl group, an alkenyl group, an aryl group, a cycloalkyl group, an alkoxyalkyl group or an alkoxy group, Formula (3)

wherein $R_7$ and $R_8$ each represent a substituted or unsubstituted hydrocarbon group, provided that, when a ring containing S is formed, no aromatic group is contained, Formula (4)

wherein:
M represents a hydrogen atom, a metal atom or a quarternary ammonium;
Z represents a nitrogen-containing heterocyle;
n represents an integer of 0 to 5;
$R_9$ represents a hydrogen atom, a halogen atom, an alkyl group, an aryl group, an alkylcarbonamide group, an arylcaryonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, the aryloxycarbonyl group, an alkylcarbonyl group, an arylcarbonyl group, an acyloxy group, a carboxyl group, a carbonyl group, a sulfonyl group, an amino group, a hydroxy group, or a heterocycle group; and
when n is an integer of two or more, each $R_9$ may be the same or different, and each $R_9$ may be combined to form a condensed ring.

(5) The display element of any one of Items (1) to (4), wherein the display element satisfies Condition (1):

$0 \leq [X]/[Ag] \leq 0.01$   Condition (1)

wherein:
[X](mole/kg) represents a molar content of halogen ions or halogen atoms contained in the electrolyte layer; and

[Ag] (mole/kg) represents a total molar content of silver or silver contained in the compound comprising silver in the chemical structure, contained in the electrolyte layer.

(6) The display element of any one of Items (1) to (5), wherein the driving operation comprises an operation to deposit blackened silver at a potential higher than an overpotential and an operation to continue depositing the blackened silver at a potential lower than the overpotential.

Effects of the Invention

According to the present invention, a display element having a simple display construction and exhibiting a low drive voltage, a high display contrast, a sufficiently high reflectance of white display and a small variation of the reflectance of white display can be obtained.

EXPLANATION OF CODES

1. Opposed electrodes
2. Electrolyte layer
3. Power source
4. Earthing

BEST MODES FOR CARRYING OUT THE INVENTION

The best modes of the present invention will be described below in detail.

As a result of extensive studies by the inventor of the present invention, it was found that a display element having a simple display construction and exhibiting a low drive voltage, a high display contrast, a sufficiently high reflectance of white display and a small variation of the reflectance of white display is achieved by a display element comprising opposed electrodes having therebetween: an electrolyte layer comprising an electrolyte solvent, and silver or a compound comprising silver in the chemical structure; and a porous-white scattering material, the display element being driven by a driving operation so as to dissolve silver or to deposit silver by using the opposed electrodes, wherein the porous-white scattering material is incorporated between the opposed electrode by the following method comprising the steps of: applying an aqueous mixture on a constituting member incorporated between the opposed electrodes; and drying the aqueous mixture, the aqueous mixture comprising a white pigment and a water-soluble polymer being substantially insoluble in the electrolyte solvent.

Details of the display element present invention will now be explained.

The display element of the present invention is an ED method display containing opposed electrodes having therebetween an electrolyte layer containing silver or a compound containing silver in the chemical structure, in which the display element is driven by a driving operation so as to dissolve silver or to deposit silver using the opposed electrodes.

The display element of the present invention is prepared based on a new preparation method. Namely, a white pigment is dispersed in an aqueous solution of a water-soluble polymer to form an aqueous mixture, the water-soluble polymer being substantially insoluble to the electrolyte liquid. The aqueous mixture is applied to a constituting member of the display element between the opposed electrodes, followed by drying, and then the constituting member is incorporated in the display element. In this method, stability of dispersion is obtained, because the white pigment particles are fixed with each other via the water-soluble polymer. Also, a sufficient reflectance of white display is obtained, since the difference in refractive index between the electrolyte liquid and the white pigment is sufficiently large. Further, the present method of preparation is simple and easy to apply to a large area display element, and also, it is friendly to environment.

[Silver or Compound Containing Silver in the Chemical Structure]

The term "silver or a compound containing silver in the chemical structure", according to the present invention, is a general term referring to compounds such as silver oxide, silver sulfide, metallic silver, colloidal silver particles, silver halide, a silver complex compound, or silver ions, and phase states such as a solid state, a dissolved state in a liquid, or a gaseous state, as well as charge states such as a neutral state, an anionic state, or a cationic state are not particularly specified.

[Basic Structure of the Display Element]

Figure 1:
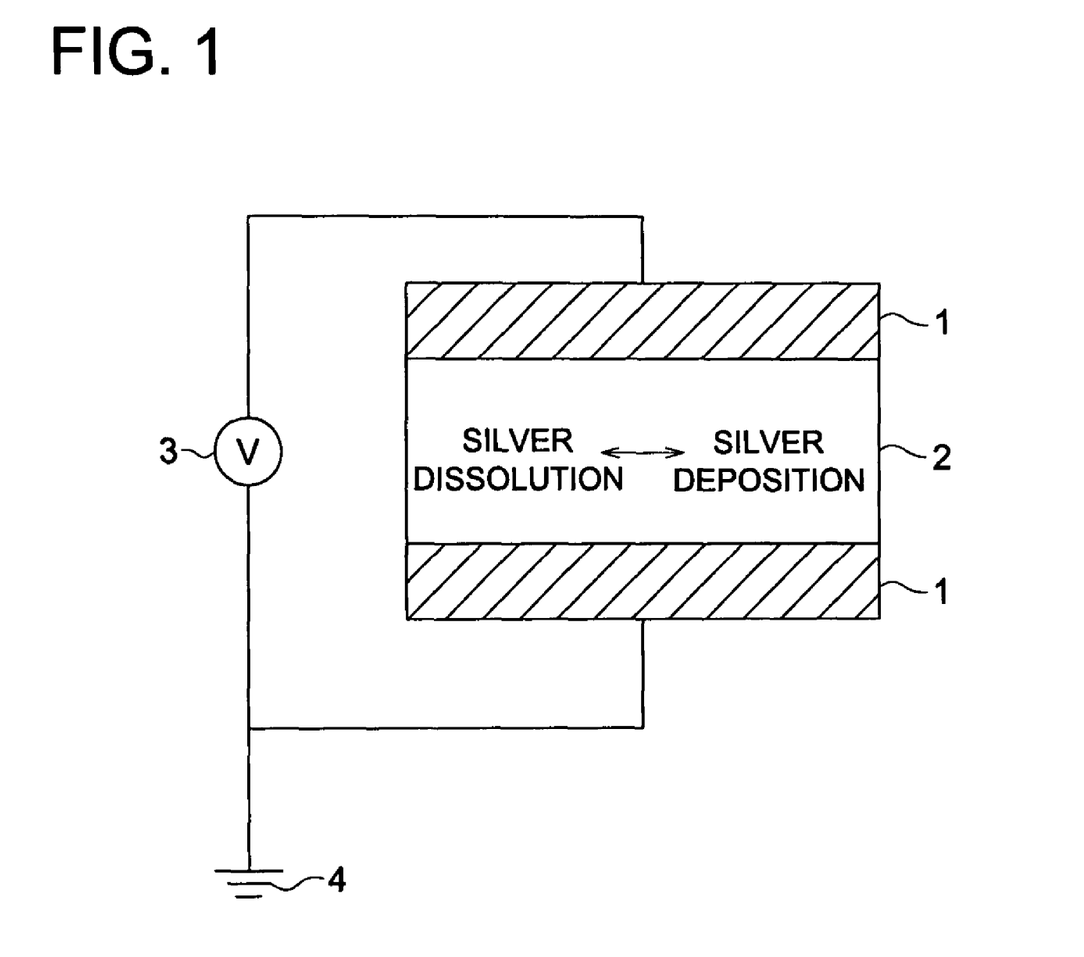
FIG. 1 is a schematic cross-section view illustrating the basic structure of the display element of the present invention.

FIG. 1 is a schematic cross-sectional view showing the basic structure of the display element of the present invention.

As shown in FIG. 1, the display element of the present invention incorporates electrolyte layer 2 between a pair of opposed electrodes 1. In the display element, the display state is varied utilizing differences in optical properties of the silver-containing compound such as transmission and absorption of light. The optical properties of silver-containing compound is changed by dissolving silver in electrolyte layer 2 or depositing silver from electrolyte layer 2 by applying voltage or current through the opposed electrodes 1 from power source 3.

The porous-white scattering material is incorporated between the opposed electrode by the following method comprising the steps of: applying an aqueous mixture on a constituting member incorporated between the opposed electrodes; and drying the aqueous mixture, the aqueous mixture comprising a white pigment and a water-soluble polymer being substantially insoluble in the electrolyte solvent.

[Porous-White Scattering Material]

The porous-white scattering material of the present invention is characterized in that an aqueous mixture comprising a white pigment and a water-soluble polymer which is substantially insoluble in the electrolyte solvent is applied on a constituting member incorporated between the opposed electrodes, followed by drying, and then incorporated in the display element.

Examples of a white pigment employable in the present invention include: titanium dioxide (an anatase type or a rutile type), barium sulfate, calcium carbonate, aluminum oxide, zinc oxide, magnesium oxide, zinc hydroxide, magnesium hydroxide, magnesium phosphate, magnesium hydrogen phosphate, alkaline earth metal salt, talc, kaolin, zeolite, Japanese acid clay, glass; as an organic compound: polyethylene, polystyrene, acryl resin, ionomer, ethylene-vinylacetate copolymer resin, benzoguanamine resin, urea-formalin resin, melamine-formalin resin and polyamide resin, which may be used alone or in combination, or in the form of having voids which may vary the refractive index in the particles. In the present invention, titanium dioxide, zinc oxide and zinc hydroxide are preferably used among the above white particles. Also, titanium dioxide being subjected to a surface treatment with an inorganic oxide (for example, $Al_2O_3$, AlO (OH) and $SiO_2$), and, in addition to these surface treatment, titanium dioxide being subjected to a treatment using an organic substance such as trimethylolethane, triethanolamine acetate or trimethylcyclo silane is usable.

Of these white particles, preferable are titanium oxide and zinc oxide in view of avoiding coloring at higher temperatures and reflectance induced by the refractive index of the display element.

Examples of a water-soluble polymer of the present invention substantially insoluble to the electrolyte solvent include: protein and cellulose derivatives such as gelatin and a gelatin derivative; natural products such as starch, gum arabic, dextran, pullulan and polysaccharides such as carrageenan; and synthetic polymers such as polyvinyl alcohol, polyvinyl pyrrolidone, acrylamide polymers and derivatives thereof. Examples of a gelatin derivative include: acetylated gelatin and phthalized gelatin. Examples of a gelatin derivative include: acetylated gelatin and phthalized gelatin. Examples of a polyvinyl alcohol derivative include: terminal alkyl group modified polyvinyl alcohol and terminal mercapto group modified polyvinyl alcohol. Examples of a cellulose derivative include: hydroxyethyl cellulose, hydroxypropyl cellulose and carboxymethyl cellulose. Also included are water-soluble polymers disclosed in Reasarch Disclosure (hereafter referred to as RD) and in pages 71 to 75 of JP-A No. 64-13546; super absorbent polymers disclosed in U.S. Pat. No. 4,960,681 and JP-A No. 62-245260, namely, the homopolymer of the vinyl monomer which has —COOM or —$SO_3$M (M is a hydrogen atom or an alkali metal) and copolymers of these vinyl monomers or copolymers of these vinyl monomers and other vinyl monomers (for example, sodium methacrylate and ammonium methacrylate). Two or more of these binders may be used in combination.

In the present invention, gelatin and a gelatin derivative; and polyvinyl alcohol and its derivative can be used preferably.

The expression "substantially insoluble in the electrolyte solvent" as used in the present invention is defined as that the amount of dissolution in 1 kg of electrolyte solvent is 0 g-10 g at temperatures of −20° C. to 120° C. The amount of dissolution can be determined by well known methods, such as gravimetric measurement and determination method by using liquid chromatogram or gas chromatogram.

In the aqueous mixture of a water-soluble polymer and a white pigment of the present invention, the white pigment is preferably dispersed in water using a well-known dispersion method. The mixing ratio of (water soluble polymer)/(white pigment) is preferably 1-0.01 by volume and more preferably 0.3-0.05 by volume. The total amount of the water-soluble polymer and the white pigment is preferably 25 mass % or more and 70 mass % or less based on the mass of water. The medium (constituting member) of the present invention to which the aqueous mixture is applied may be any member as far as it is a constituting member incorporated between the opposed electrodes (namely, it can be located anywhere between the opposed electrodes), however, it is preferable that the aqueous mixture is applied on at least one of the electrodes. As the applying method on the medium, for example, a coating method and a spray method are cited. Examples of a spray method through a gas phase include: a piezo inkjet head, a Bubble jet (R) type inkjet head by which a droplet of liquid is ejected from a thermal head using a bumping phenomenon and a spray method using air pressure or liquid pressure to spray liquid. Of these, a coating method is preferable. As for the amount of applied aqueous mixture on the constituting member, it is preferably that the thickness is 2 μm to 300 μm just after applied. The applying method can be appropriately selected from the methods known in the art, examples of which include: an air doctor applicator, a blade coater, a rod applicator, a knife coater, a squeeze applicator, an impregnation applicator, a reverse roller coater, a transfer roller coater, a curtain coater, a double roller coater, a slide hopper coater, a gravure coater, a kiss roller coater, a bead coater, a cast coater, a spray coater, calender coater and an extrusion coater.

The method to dry the aqueous mixture of the water-soluble polymer and the white pigment applied to the medium of the present invention is not specifically limited as far as the water can be evaporated. For example, the heat from a heat source, the heating method using infrared light, the heating method by electromagnetic induction are cited. Moreover, the evaporation of water can be performed under a reduced pressure. The time and temperature of drying are preferably 5 minutes—5 hours and 45° C.-85° C., respectively, under an atmospheric pressure. The expression of "porous" in the present invention means a penetratable condition of ions where the ions are formaldehyde), an aziridine hardening agent, an epoxy hardening agent, a vinylsulfone hardening agent (for example, N,N'-ethylene-bis(vinylsulfonyl acetamide)ethane), N-methylol hardening agent (for example, dimethylolurea), a boric acid, a metaboric acid and polymer hardening agents (for example, compounds disclosed in JP-A No. 62-234157). When gelatin is used as a water-soluble polymer, it is preferable that, among hardening agents, vinylsulfone hardening agents and chlorotriazine hardening agent are used alone or in combination. When polyvinyl alcohol is used, preferable is to use a boron-containing agents, such as boric acid or metaboric acid.

The amount of used hardening agent is 0.001-1 g per 1 g of water-soluble polymer and preferably 0.005 to 0.5 g. Also, it is possible to conduct a heat treatment to enhance the layer strength or to control the humidity during the hardening reaction.

In the display element of the present invention, the electrolyte layer preferably contains at least one compound represented by abovementioned Formula (1) or Formula (2) and at least one compound represented by abovementioned Formula (3) and Formula (4) transferable between the electrodes and the dissolution-deposition reaction of silver can be conducted by applying voltage between the opposed electrodes in the display element fabricated by: applying an aqueous mixture of the abovementioned water-soluble polymer and a white pigment on an electrodes to form a porous-white scattering material, followed by drying; providing an electrolyte liquid containing silver or a compound containing silver in the chemical structure on the porous-white scattering material; and sandwiching the resultant material by the opposed electrodes.

It is preferable to perform a curing reaction of water-soluble polymer with a hardener during the drying process or after the drying process of the abovementioned aqueous mixture applied on the constituting member between the opposed electrodes, in the display element of the present invention.

As examples of a hardening agent used in the present invention, cited are the hardening agents disclosed in, for example, 41st column of U.S. Pat. No. 4,678,739, U.S. Pat. No. 4,791,042, JP-A Nos. 59-116655, 62-245261, 61-18942, 61-249054, 61-245153 and 4-218044. Examples of specific examples include: an aldehyde hardening agent (for example,

The compound represented by Formula (1) will be explained, first.

In the abovementioned Formula (1), L represents an oxygen atom or $CH_2$, and $R_1$-$R_4$ each represent a hydrogen atom, an alkyl group, an alkenyl group, an aryl group, a cycloalkyl group, an alkoxy alkyl group or an alkoxy group.

Examples of an alkyl group include: a methyl group, an ethyl group, a propyl group, an isopropyl group, a tert-butyl group, a pentyl group, a hexyl group, an octyl group, a dodecyl group, a tridecyl group, a tetradecyl group and a pentadecyl group; examples of an aryl group include: a phenyl group and a naphthyl group; examples of a cycloalkyl group include: a cyclopentyl group and a cyclohexyl group; examples of an alkoxyalkyl group include: β-methoxyethyl group and γ-methoxypropyl group; and examples of an alkoxy group include: a methoxy group, an ethoxy group, a propyloxy group, a pentyloxy group, a hexyloxy group, an octyloxy group and a dodecyloxy group.

Specific examples of a compound represented by Formula (1) of the present invention will be shown below, however, the present invention is not limited thereto.

The compounds represented by Formula (1) are commercially available, for example, propylene carbonate produced by Showa Denko K. K. and propylene carbonate produced by Kanto Chemical Co., Inc. Also, these compounds can be synthesized according to the method given in AIST Today, 2003, 05 Vol. 3-5.

Subsequently, the compound represented by Formula (2) of the present invention will be explained.

In abovementioned Formula (2), $R_5$, $R_6$ each represent a hydrogen atom, an alkyl group, an alkenyl group, an aryl group, a cycloalkyl group, an alkoxyalkyl group or an alkoxy group.

Examples of an alkyl group include: a methyl group, an ethyl group, a propyl group, an isopropyl group, a tert-butyl group, a pentyl group, a hexyl group, an octyl group, a dodecyl group, a tridecyl group, a tetradecyl group and a pentadecyl group; examples of an aryl group include: a phenyl group and a naphthyl group; examples of a cycloalkyl group include: a cyclopentyl group and a cyclohexyl group; examples of an alkoxyalkyl group include: β-methoxyethyl group and γ-methoxypropyl group; and examples of an alkoxy group include: a methoxy group, an ethoxy group, a propyloxy group, a pentyloxy group, a hexyloxy group, an octyloxy group and a dodecyloxy group.

Specific examples of a compound represented by Formula (2) of the present invention will be shown below, however, the present invention is not limited thereto.

The compounds represented by Formula (2) are commercially available, for example, ethylene carbonate produced by Maruzen Petrochemical Co., Ltd. and ethylene carbonate produced by Kanto Chemical Co., Inc. Also, these compounds can be synthesized according to the method given in AIST Today, 2003, 05 Vol. 3-5.

Among the compounds represented by Formula (1) and Formula (2), exemplified compounds (1-1), (1-2) and (2-3) are specifically preferable.

The compounds represented by Formula (1) and Formula (2) of the present invention belong to one sort of an electrolyte solvent. In the display element of the present invention, another solvent can be used in combination, provided that the object effect of the present invention is not lost. Examples of such a solvent include: tetramethylurea, sulfolane, dimethyl sulfoxide, 1,3-dimethyl-2-imidazolidinone, 2-(N-methyl)-2-pyrrolidinone, hexamethylphosphortriamide, N-methyl propione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethylacetate, ethylpropionate, dimethoxyethane, diethoxyfuran, tetrahydrofuran, ethylene glycol, diethylene glycol, triethylene glycol monobutyl ether and water.

It is preferable that, among these solvents, at least one solvent having a freezing point of −20° C. or lower and a boiling point of 120° C. or more is incorporated.

Further, listed as solvent employable in the present invention are the compounds shown in: J. A. Riddick, W. B. Bunger, T. K Sakano, "Organic Solvents", 4th. ed., John Wiley & Sons (1986), Y. Marcus, "Ion Solvation", John Wiley & Sons (1985), C. Reichardt, "Solvents and Solvent Effects in Chemistry", 2nd ed., VCH (1988) and G. J. Janz, R. P. T. Tomkins, "Nonaqueous Electorlytes Handbook", Vol. 1, Academic Press (1972).

In the present invention, the electrolyte solvent may be a single kind or may be a mixture, however, a mixed solvent containing ethylene carbonate is preferable. The added amount of ethylene carbonate is preferably 10 mass % or more but 90 mass % or less. A mixed electrolyte solvent having a (propylene carbonate)/(ethylene carbonate) mass ratio of 7/3 to 3/7 is specifically preferable. When the propylene carbonate mass ratio is larger than 7/3, ionic conductivity of the electrolyte may become lower, resulting in decrease of response rate, while when it is smaller than 3/7, deposition of electrolyte tends to occur at a lower temperature.

In the present invention, it is preferable to use a compound represented by abovementioned Formula (3) or Formula (4) together with a compound represented by above-mentioned Formula (1) or Formula (2).

In abovementioned Formula (3), $R_7$ and $R_8$ each represent a substituted or unsubstituted hydrocarbon group, which may contain a normal chain group or a branched chain group of an aromatic compound. Also, the hydrocarbon group may contain one or more nitrogen atoms, oxygen atoms, phosphorus atoms, sulfur atoms, or halogen atoms, provided that, when a ring containing S atom is formed, no aromatic group is contained.

Examples of a substituent of the hydrocarbon group include an amino group, a guanidino group, a quarternary ammonium group, a hydroxyl group, a halogen compound, a carboxylic acid group, a carboxylate group, an amide group, a sulfinic acid group, a sulfonic acid group, a sulfate group, a phosphonic acid group, a phosphate group, a nitro group and a cyano group.

Generally, in order to carry out dissolution-deposition of silver, it is necessary to solubilize silver in the electrolyte layer. For example, it is common to use a method by which silver or a compound containing silver is converted to a soluble compound, by coexisting silver or a compound containing silver with a compound having a chemical structure which can interact with silver, for example, to form a coordinate bond with silver or to form a weak covalent bond with silver. Known examples of such a chemical structure include: a halogen atom, a mercapto group, a carboxyl group and an imino group. In the present invention, a thioether group is also useful and works as a silver resolvent having less influence to the coexisting compounds and a high solubility to the solvent.

Specific examples of a compound represented by Formula (3) of the present invention will be shown below, however, the present invention is not limited thereto.

The compounds represented by Formula (3) are commercially available, for example, 3-thia-1,5-pentanediol produced by Kanto Chemical Co., Inc. Also, these compounds can be synthesized according to the method given U.S. Pat. No. 4,126,459 or JP-A No. 2003-267899.

3-1: $CH_3SCH_2CH_2OH$
3-2: $HOCH_2CH_2SCH_2CH_2OH$
3-3: $HOCH_2CH_2SCH_2CH_2SCH_2CH_2OH$
3-4: $HOCH_2CH_2SCH_2CH_2SCH_2CH_2SCH_2CH_2OH$
3-5: $HOCH_2CH_2SCH_2CH_2OCH_2CH_2SCH_2CH_2OH$
3-6: $HOCH_2CH_2OCH_2CH_2SCH_2CH_2SCH_2CH_2OCH_2CH_2OH$
3-7: $H_3CSCH_2CH_2COOH$ 3-8: HOOCCH₂SCH₂COOH
3-9: HOOCCH₂CH₂SCH₂CH₂COOH
3-10: HOOCCH₂SCH₂CH₂SCH₂COOH
3-11: HOOCCH₂SCH₂CH₂SCH₂CH₂SCH₂CH₂SCH₂COOH
3-12: HOOCCH₂CH₂SCH₂CH₂SCH₂CH(OH)CH₂SCH₂CH₂SCH₂COOH
3-13: HOOCCH₂CH₂SCH₂CH₂SCH₂CH(OH)CH(OH)CH₂SCH₂CH₂SCH₂COOH
3-14: H₃CSCH₂CH₂CH₂NH₂
3-15: H₂NCH₂CH₂SCH₂CH₂NH₂
3-16: H₂NCH₂CH₂SCH₂CH₂SCH₂CH₂NH₂
3-17: H₂CSCH₂CH₂CH(NH₂)COOH
3-18: H₂NCH₂CH₂OCH₂CH₂SCH₂CH₂SCH₂CH₂OCH₂CHNH₂
3-19: H₂NCH₂CH₂SCH₂CH₂OCH₂CH₂OCH₂CH₂SCH₂CH₂NH₂
3-20: H₂NCH₂CH₂SCH₂CH₂SCH₂CH₂SCH₂CH₂NH₂
3-21: HOOC(NH₂)CHCH₂CH₂SCH₂CH₂SCH₂CH₂CH(NH₂)COOH
3-22: HOOC(NH₂)CHCH₂SCH₂CH₂OCH₂CH₂OCH₂SCH₂CH₂(NH₂)COOH
3-23: HOOC(NH₂)CHCH₂OCH₂CH₂SCH₂CH₂SCH₂CH₂OCH₂CH(NH₂)COOH
3-24: H₂N(=O)CCH₂SCH₂CH₂OCH₂CH₂OCH₂CH₂SCH₂C(=O)NH₂
3-25: H₂N(O=)CCH₂SCH₂CH₂SCH₂C(O=)NH₂
3-26: H₂NHN(O=)CCH₂SCH₂CH₂SCH₂C(=O)NHNH₂
3-27: H₃C(O=)NHCH₂CH₂SCH₂CH₂SCH₂CH₂NCH(O=)CH₃
3-28: H₂NO₂SCH₂CH₂SCH₂CH₂SCH₂CH₂SO2NH₂
3-29: NaO₃SCH₂CH₂CH₂SCH₂CH₂SCH₂CH₂CH₂SO₃Na
3-30: H₃CSO₂NHCH₂CH₂SCH₂CH₂SHC₂CH₂NHO₂SCH₃
3-31: H₂—N(NH)CSCH₂CH₂SC(NH)₂.2HBr
3-32: H₂(NH)CSCH₂CH₂OCH₂CH₂OCH₂CH₂SC(NH)NH₂.2HCl
3-33: H₂N(NH)CNHCH₂CH₂SCH₂CH₂SCH₂CH₂NHC(NH)NH₂.2HBr
3-34: [(CH₃)₃NCH₂CH₂SCH₂CH₂SCH₂ CH₂N(CH₃)]²⁺.2Cl⁻

3-35

3-36

-continued 3-37

3-38

3-39

3-40

3-41

3-42

3-43

3-44

3-45

3-46

3-47

Among the above exemplified compounds, exemplified compound (3-2) is specifically preferable to fully achieve the effect of the present invention.

Next, the compound represented by Formula (4) of the present invention will be explained.

In Formula (4), M represents a hydrogen atom, a metal atom or a quarternary ammonium; Z represents a nitrogen-containing heterocyle, provided that Z is not an imidazole ring; n represents an integer of 0 to 5; $R_9$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, an hydroxy group, or a heterocyclic group; and when n is an integer of two or more, each $R_9$ may be the same or different, and each $R_9$ may be combined to form a condensed ring.

Examples of a metal atom represented by M include Li, Na, K, Mg, Ca, Zn and Ag. Examples of a quarternary ammonium include $NH_4$, $N(CH_3)_4$, $N(C_4H_9)_4$, $N(CH_3)_3Cl_2H_{25}$, $N(CH_3)_3C_{16}H_{33}$, and $N(CH_3)_3CH_2C_6H_5$.

Examples of a nitrogen-containing heterocyclic ring represented by Z in Formula (4) include a tetrazole ring, a triazole ring, an oxydiazole ring, a thiadiazole ring, an indole ring, an oxazole ring, a benzoxazole ring, a benzothiazole ring, a benzoselenazole ring and a naphthoxazole ring.

In Formula (4), $R_9$ represents one of the atoms or groups listed below:

examples of a halogen atom include a fluorine atom, a chlorine atom, a bromine atom and an iodine atom;

examples of an alkyl group include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group;

examples of an aryl group include a phenyl group, and a naphthyl group;

examples of an alkylcarbonamide group include an acetylamino group, a propionylamino and a butyroylamino group;

examples of an arylcarbonamide group include an benzoylamino group;

examples of an alkylsulfonamide group include a methanesulfonylamino group and an ethanesulfonylamino group;

examples of an arylsulfonamide group include a benzenesulfonylamino group and a toluenesulfonylamino group;

examples of an arylsulfonamide group include a benzenesulfonylamino group and a toluenesulfonylamino group;

examples of an aryloxy group include a phenoxy group;

examples of an alkylthio group include a methylthio group, an ethylthio group and a butylthio group;

examples of an aryltion group include a phenylthio group and a tolylthio group;

examples of an alkylcarbamoyl group include a methylcarbamoyl group, a dimethylcarbamoyl group, an ethylcarbamoyl group, a diethylcarbamoyl group, a dibutylcarbamoyl group, a piperidylcarbamoyl group, and a morpholylcarbamoyl group;

examples of an arylcarbamoyl group include a phenylcarbamoyl group, a methylphenylcarbamoyl group, an ethylphenylcarbamoyl group and a benzylphenylcarbamoyl group;

examples of an alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group, and a morpholylsulfamoyl group;

examples of an arylsulfamoyl group include a phenylsulfamoyl group, a methylphenylsulfamoyl group, an ethylphenylsulfamoyl group, and a benzylphenylsulfamoylgroup;

examples of an alkylsulfonyl group include a methanesulfonyl group and an ethanesulfonyl group;

examples of an arylsulfonyl group include a phenylsulfonyl group, a 4-chlorophenylsulfonyl group and a p-toluenesulfonyl group;

examples of an alkoxycarbonyl group include a methoxycarbonyl group, an ethoxycarbonyl group and a butoxycarbonyl group;

examples of an aryloxycarbonyl group include a phenoxy carbonyl group;

examples of an alkylcarbonyl group include an acetyl group, a propionyl group and a butyroyl group;

examples of an arylcarbonyl group include a benzoyl group and an alkylbenzoyl group;

examples of an acyloxy group include an acetyloxy group, a propionyloxy group and a butyroyloxy group;

examples of an heterocyclic group include an oxazole ring, a thiazole ring, a triazole ring, a selenazole ring, a tetrasol ring, an oxadiazole ring, a thiadiazole ring, a thiazin ring, a triazine ring, a benzoxazole ring, a benzthiazole ring, a benzimidazole ring, the indolenine ring, a benzselenazole ring, the naphthothiazole ring, a triazaindolizine ring, a diazaindolizine ring and a tetraazaindolizine ring. These substituents may further have a substituent.

Specific examples of a compound represented by Formula (4) will be shown below, however, the present invention is not limited thereto.

The compounds represented by Formula (4) are commercially available, for example, 2-mercaptobenzoxazole produced by Tokyo Chemical Industry Co. Also, these compounds can be synthesized according to the method disclosed in JP-A No. 1-4739 or No. 3-10172.

4-1

4-2

4-3

-continued

4-4

4-5

4-6

4-7

4-8

4-9

4-10

4-11

4-12

-continued

4-13

4-14

4-15

4-16

4-17

4-18

4-19

Among the above exemplified compounds, exemplified compounds (4-12) and (4-18) are specifically preferable to fully achieve the effect of the present invention.

In the display element of the present invention, when a molar content of halogen ions or halogen atoms contained in the electrolyte layer represented as [X](mole/kg) and a total molar content of silver or silver contained in the compound having silver in the chemical structure is represented as [Ag](mole/kg), it is preferable that following Condition (1) is satisfied:

$$0 \leq [X]/[Ag] \leq 0.01 \quad \text{Condition (1)}$$

In the present invention, "a halogen atom" means an iodine atom, a chlorine atom, a bromine atom or a fluorine atom.

When the [X]/[Ag] value is larger than 0.01, the reaction of $X^- \rightarrow X_2$ tends to occur while silver is oxidized-reduced. $X_2$ easily dissolves blackened silver by cross-oxidizing the blackened silver, which is one of the factors degrading memory function of the display. Accordingly, the molar content of halogen is preferably as low as possible against the molar content of silver. In the present invention, more preferable is $0 \leq [X]/[Ag] \leq 0.001$. When halogen ions are added, with respect to improving a memory function, the total molar content of each halogen species preferably satisfies [I]<[Br]<[Cl]<[F].

(Electrolyte-Silver Salt)

In the display element of the present invention, silver salts known in the art can be used. Examples of such silver salts include: silver iodide, silver chloride, silver bromide, silver oxide, silver sulfide, silver citrate, silver acetate, silver behenate, a silver salt of p-toluenesulfonic acid, a silver salt of mercapto compound and a silver complex with an iminodiacetic acid. Of these, preferable is a silver salt which does not contain a nitrogen atom having coordinating property with halogen, carboxylic acid or silver, for example, a silver salt of p-toluenesulfonic acid is preferable.

The content of silver ions in the electrolyte layer of the present invention is preferably $0.2$ mole/kg $\leq$ [Ag] $\leq 2.0$ mole/kg. When the content of silver ions is smaller than 0.2 mole/kg, the silver solution becomes too diluted and the driving rate is reduced, while, when the content of silver ions is larger than 2 mole/kg, the solubility becomes too low, and precipitation tends to occur while stored at a lower temperature, which is disadvantageous.

(Electrolyte Materials)

In the display element of the present invention, when electrolytes are in liquid form, it is possible to incorporate, in the electrolytes, the following compounds. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonim borofluoride, tetrabutylammonium borofluoride, and tetrabutylammonium halide. In addition, preferably used are fused salt electrolyte compositions described in paragraphs [0062]-[0081] of JP-A No. 2003-187881. Further employed are compounds which form oxidation-reduction pairs such as $I^-/I_3^-$, $Br^-/Br_3^-$ and quinone/hydroquinone.

Further, when electrolytes are in solid form, it is possible to incorporate, in the electrolytes, the following compounds which exhibit electronic or ionic conductivity.

Listed are fluorinated vinyl based polymers containing perfluorosulfonic acid; polythiophene; polyaniline; polypyrrole, triphenylamines; polyvinylcarbazoles; polymethylphenylsilanes; calcogenides such as $Cu_2S$, $Ag_2S$, $Cu_2Se$, or $AgCrSe_2$; fluorine compounds such as $CaF_2$, $PbF_2$, $SrF_2$, $LaF_3$, $TlSn_2F_5$, or $CeF_3$; lithium salts such as $Li_2SO_4$ or $Li_4SiO_4$; as well as compounds such as $ZrO_2$, $CaO$, $Cd_2O_3$, $HfO_2$, $Y_2O_3$, $Nb_2O_5$, $WO_3$, $Bi_2O_3$, AgBr, AgI, CuCl, CuBr, CuBr, CuI, LiI, LiBr, LiCl, $LiAlCl_4$, $LiAlF_4$, $AgSBr$, $C_5H_5NHAg_5I_6$, $Rb_4Cu_{16}I_7Cl_{13}$, $Rb_3Cu_7Cl_{10}$, LiN, $Li_5NI_2$, or $Li_6NBr_3$.

Further employed as supporting electrolytes may be electrolytes in gel form. When electrolytes are nonaqueous, it is possible to employ oil gelling agents described in paragraphs [0057]-[0059] of JP-A No. 11-185836.

(Thickening Agents Added to the Electrolyte Layer)

In the display element of the present invention, it is possible to use thickening agents in the electrolyte layer. Examples include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, polyacrylic acid, and polyurethane as a transparent hydrophobic binder.

These thickening agents may be employed in combinations of at least two types. Further listed are the compounds described on pages 71-75 of JP-A No. 64-13546. Of these, in view of compatibility with various types of additives and enhancement of dispersion stability of white particles, preferably employed compounds are polyvinyl alcohols, polyvinylpyrrolidones, hydroxypropyl celluloses, and polyalkylene glycols.

(Other Additives to the Electrolyte Layer)

In the display element of the present invention, listed as constitution layers include ancillary layers such as a protective layer, a filter layer, an antihalation layer, a cross-over light cutting layer, or a backing layer. If required, incorporated in these ancillary layers may be various chemical sensitizers, noble metal sensitizers, photosensitive dyes, supersensitizers, couplers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbers, antirradiation dyes, filter light absorbing dyes, mildewcides, polymer latexes, heavy metals, antistatic agents, and matting agents.

The additives listed above are more detailed in Research Disclosure Volume 176 Item/17643 (December 1978), RD Volume 184 Item/18431 (August 1979), DR Volume 187 Item/18716 (November 1979), and RD Volume 308 Item/308119 (December 1989).

Types of compounds and their citations in these three Research Disclosures are listed below.

| | Additives | | | | | |
|---|---|---|---|---|---|---|
| | RD 17643 | | RD 18716 | | RD 308119 | |
| | Page | Section | Page | Section | Page | Section |
| Chemical Sensitizers | 23 | III | 648 | right top | 96 | III |
| Sensitizing Dyes | 23 | IV | 648-649 | | 996-8 | IV |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |

-continued

| | Additives | | | | | |
|---|---|---|---|---|---|---|
| | RD 17643 | | RD 18716 | | RD 308119 | |
| | Page | Section | Page | Section | Page | Section |
| Hardeners | 26 | X | 651 | left | 1004-5 | X |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

(Layer Configuration)

The layer configuration between the opposed electrodes related to the display element of the present invention will now be described in more detail.

As the layer configuration related to the display element of the present invention, it is possible to arrange a constituting layer containing positive hole transport materials. Examples of positive hole transport materials include aromatic amines, triphenylene derivatives, oligochiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CUSCN, CuInSe$_2$, Cu(In,Ga)Se, CuGaSe$_2$, Cu$_2$O, CuS, CuGaS$_2$, CuInS$_2$, CuAlSe$_2$, GaP, NiO, CoO, FeO, Bi$_2$O$_3$, MoO$_2$, and Cr$_2$O$_3$.

(Substrates)

Examples of a support employable in the display element of the present invention include: polyolefins such as polyethylene or polypropylene, polycarbonates, cellulose acetate, polyethylene terephthalate, polyethylene dinaphthalene dicarboxylate, polystyrene naphthalates, polyvinyl chloride, polyimide, polyvinyl acetals, and polystyrene. In addition, preferred are syndiotatic structured polystyrenes. These are prepared employing the methods described, for example, in each of JP-A Nos. 62-117708, 1-46912, and 1-178505. Further listed examples include metal substrates including stainless steel, paper supports such as baryta paper or resin coated paper, supports including the above plastic film having thereon a reflection layer, and those which are described in JP-A No. 62-253195 (pages 29-31) as a support. Further preferably employed are those described on page 28 of RD No. 17643, from the right column to the left column on page 648 of RD No. 18716, and on page 879 of RD No. 307105. As described in U.S. Pat. No. 4,142,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the present invention, employed as surface treatments may be a glow discharge treatment, an ultraviolet radiation irradiation treatment, a corona treatment and a flame treatment. Further employed may be supports described on pages 44-149 of Kochi Gijutsu (Prior Art Technology) No. 5 (published by AZTEC Corp., dated Mar. 22, 1991). Further listed are those described on page 1009 of RD No. 308119, as well as in the item "Supports" on page 108 of Product Licensing Index Volume 92. Other than the above, employed may be glass substrates as well as epoxy resins kneaded with glass powder.

(Electrodes)

In the display element of the present invention, it is preferable that at least one of the opposed electrodes is a metal electrode. Employed as metal electrodes may be metals such as platinum, gold, silver, copper, aluminum, zinc, nickel, titanium, or bismuth, as well as alloys thereof, which are known in the art. Preferred metals employed in the metal electrodes are those which exhibit a work function near the oxidation-reduction potential of silver in electrolytes. Of these, a silver electrode or an electrode composed of silver in an amount of at least 80 percent is advantageous to maintain a reduced state of silver, and in addition, results in anti-staining of electrodes. Employed as methods for preparing electrodes may be conventional ones such as a evaporating method, a printing method, an ink-jet method, a spin coating method, or a CVD method.

Further, it is preferable that in the display element of the present invention, at least one of the opposed electrodes is a transparent electrode. Transparent electrodes are not particularly limited as long as they are transparent and electrically conductive. Examples include indium tin oxide (ITO), indium zinc oxide (IZO), tin oxide, fluorine-containing tin oxide (FTO), indium oxide, zinc oxide, platinum, gold, silver rhodium, copper, chromium, carbon, aluminum, silicon, amorphous silicon, and BSO (bismuth silicon oxide). In order to form electrodes as described above, for example, an ITO layer may be subjected to mask evaporation on a substrate employing a sputtering method, or after forming an ITO layer on the entire surface, patterning may be performed employing a photolithographic method. The surface resistance value is preferably 100 Ω/sq or less, but is more preferably 10 Ω/sq or less. The thickness of the transparent electrodes is not particularly limited but is commonly 0.1-20 μm.

(Other Components Constituting the Display Element)

If desired, employed in the display element of the present invention may be sealing agents, column-structured materials, and spacer particles.

Sealing agents are those to seal materials so that they do not leak out. Employed as sealing agents may be heat curing, light curing, moisture curing, and anaerobic curing type resins such as epoxy resins, urethane resins, acryl resins, vinyl acetate resins, thiol-ene resins, silicone resins, or modified polymer resins.

Column-structured materials provides strong self-supporting (strength) between substrates. For example, listed may be a cylindrical form, a quadrangular form, an elliptic cylindrical form, and a trapezoidal form which are arranged at definite intervals in a specified pattern such as a lattice. Further, employed may be stripe-shaped ones arranged at definite intervals. It is preferable that the column-structured materials are not randomly arranged but arranged at an equal distance, arranged so that the interval gradually varies, or a predetermined pattern is repeated at a definite cycle so that the distance between substrates is appropriately maintained and image display is not hindered. When the column-structured materials are such that the ratio of the area occupied by the display region of a display element is 1-40 percent, sufficient strength for commercial viability is obtained as a display element.

In order to maintain a uniform gap between paired substrates, provided may be spacers between them. As such spacers, exemplified may be spheres composed of resins or inorganic oxides. Further, suitably employed are adhesion spacers the surface of which is coated with thermoplastic resins. In order to maintain the uniform gap between substrates, provided may only be column-structured materials.

However, both spacers and column-structure materials may be provided. In place of the column-structured materials, only spacers may be employed as a space-maintaining member. The diameter of spacers, when a column-structured material is formed, is at most its height, but is preferably equal to the height. When the column-structured material is not formed, the diameter of spacers corresponds to the distance of the cell gap.

(Screen Printing)

In the present invention, it is possible to form sealing agents, column-structured materials, and electrode patterns, employing a screen printing method. In screen printing methods, a screen on which predetermined patterns are formed is covered on the electrode surface, and printing materials (compositions to form column-structured materials such as light-curing resins) are placed on the screen. Subsequently a squeegee is moved at predetermined pressure, angle and rate. By such action, the printing materials are transferred onto the above substrate via the pattern of the screen. Then, the transferred materials are thermally cured and dried. When column-structured materials are formed employing the screen printing method, resinous materials are not limited to light-curing resins, but also employed, for example, may be heat curable resins such as epoxy resins or acryl resins, as well as thermoplastic resins. Listed as thermoplastic resins are polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluorocarbon resins, polyurethane resins, polyacrylonitrile resins, polyvinyl ether resins, polyvinylketone resins, polyether resins, polyvinylpyrrolidone resins, saturated polyester resins, polycarbonate resins, and chlorinated polyether resins. It is preferable that resinous materials are employed in the form of a paste while dissolved in suitable solvents.

As noted above, after forming the column-structured materials on the substrate, spacers are provided on at least one side of the substrate, and paired substrates are placed so that the electrode forming surfaces face each other, whereby a vacant cell is formed. By heating the paired facing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then liquid crystal composition may be sealed simultaneously when the substrates are allowed to adhere to each other.

(Driving Method of Display Element)

In the display element of the present invention, the preferable driving operation include depositing blackened silver by applying a voltage larger than the deposition overpotential to the pixel, followed by continuing the deposition of blackened silver by applying a voltage lower than the deposition overpotential potential to the pixel. By conducting the above driving operation, the writing energy and the load to the driving circuit can be reduced, and the writing rate can be increased. Generally, in the field of electrochemistry, it is well known that there exists an overpotential in the electrode reaction. For example, a detailed description on the overpotioal is found page 121 of "Denshi-ido no kagaku—Denkikagaku Nyumon" (1996, Asakura Publishing Co., Ltd.). In the display element of the present invention, the between the electrode and silver contained in the electrolyte is considered to be an electrochemical reaction, and it is easily understood that an overpotential exists when the dissolution and deposition of silver are carried out. The extent of overpotential depends on the exchange current density. Accordingly, it can be deduced that the surface of blackened silver has less excess electrical energy and injection of electrons is more easily carried out, because deposition of blackened silver can be continued at a lower applying voltage than the deposition overpotential of silver.

The driving operation of the display element of the present invention may be via a simple matrix drive or an active matrix drive. "Simple matrix drive", as described in the present invention, refers to the driving method in which a plurality of positive electrode lines and a plurality of negative electrode lines are placed face to face so that the positive electrode lines and the negative electrode lines cross in right angles, and electric current is sequentially applied to these positive electrode lines and negative electrode lines. By employing the simple matrix driving, it is possible to simplify the circuit structure and the driving IC, resulting in advantages such as lower production cost. Active matrix drive refers to a system in which scanning lines, data lines, and current feeding lines are formed in a checkered pattern and driving is performed by TFT circuits arranged in each of the squares of the checkered pattern. Since switching is performed for each pixel, advantages result in gradation as well as memory function. For example, a circuit disclosed in FIG. 5 of JP-A No. 2004-29327 is usable.

(Fields in which the Display Element of the Present Invention is Applied)

It is possible to apply the display element of the present invention to electronic book related field, ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers, passports and electronic books.

EXAMPLES

The present invention will now be described with reference to examples, but is not limited thereto. In the following examples, "parts" or "%" mean "mass parts" and "mass %", respectively, unless otherwise specified.

<<Preparation of Display Element>>

[Preparation of Display element 1]

(Preparation of Electrolyte liquid 1)

Added to 2.5 g of dimethyl sulfoxide were 90 mg of sodium iodide and 75 mg of silver iodide, which were completely dissolved. Thereafter, 0.5 g of titanium oxide was added and subsequently dispersed employing an ultrasonic homogenizer. Added to the resulting dispersion was 150 mg of polyvinyl pyrrolidone (average molecular weight 15,000) and the resulting mixture was stirred for one hour while heated at 120° C., whereby Electrolyte liquid 1 was obtained.

(Preparation of Transparent Electrode)

Lines of an ITO film of 4 mm width with 1 mm interval were formed on a 1.5 mm thick 2 cm×4 cm glass substrate according to the method known in the prior art, whereby a transparent electrode (Electrode 1) was obtained.

(Preparation of Metal Electrode)

Silver paste ink (produced by TOYOBO Co., Ltd.) was screen printed with a thickness of 10 μm so as to form lines of 4 mm width with 1 mm interval on a 1.5 mm thick 2 cm×4 cm glass substrate and heated for 30 minutes in a vacuum oven at 150° C., whereby a silver electrode (Electrode 2) was obtained.

(Preparation of Display Element)

Electrolyte liquid 1 was applied on Electrode 2 having, at the peripheral, an edge formed by an olefin sealant mixed with 10% by volume of spherical glass beads of an average diameter of 70 μm. Subsequently, Electrode 1 was placed on it, and then pressed at a pressure of 9.8 kPa. Thus, Display Element 1 having 2×2 pixels was prepared.

[Preparation of Display element 2]

(Preparation of Electrolyte liquid 2)

Electrolyte liquid 2 was prepared in the same manner as Electrolyte liquid 1, except that titanium oxide was not used.

A non-woven cloth having a thickness of 70 μm (Hipore, produced by Asahi Kasei Chemicals Corp.) was provided on Electrode 2 having, at the peripheral, an edge formed by an olefin sealant mixed with 10% by volume of spherical glass beads of an average diameter of 70 μm. Subsequently, Electrolyte liquid 2 was charged while not to incorporate bubbles, and Electrode 1 was placed on it, followed by pressing at a pressure of 9.8 kPa. Thus, Display element 2 was prepared.

[Preparation of Display elements 3-7]

(Preparation of White Scattering Layer)

<Preparation of White scattering layer 1>

An aqueous solution containing 2 mass % of carboxymethyl cellulose was mixed with 20 mass % of titanium oxide, and dispersed with an ultrasonic homogenizer to form an aqueous mixture. The aqueous mixture was applied on Electrode 2 having, at the peripheral, an edge formed by an olefin sealant mixed with 10% by volume of spherical glass beads of an average diameter of 70 μm, using a wire bar with a thickness of 100 μm, and dried at 80° C. for 1 hour to form White scattering layer 1 provided with an electrode.

<Preparation of White Scattering Layers 2 and 3>

White scattering layers 2 and 3 were prepared in the same manner as White scattering layer 1, except that gelatin and polyvinyl alcohol were used, respectively, instead of carboxymethyl cellulose.

<Preparation of White Scattering Layer 4>

White scattering layer 4 was prepared in the same manner as White scattering layer 2, except that 2 mass % of formaldehyde was added to gelatin and drying time was prolonged to 3 hours.

<Preparation of White Scattering Layer 5>

White scattering layer 5 was prepared in the same manner as White scattering layer 3, except that 5 mass % of metaboric acid was added to polyvinyl alcohol and drying time was prolonged to 3 hours.

(Preparation of Display Element)

On each of White scattering layers 1-5, Electrolyte liquid 2 was charged while not to incorporate bubbles, and Electrode 1 was placed on it, followed by pressing at a pressure of 9.8 kPa, to obtain Display elements 3-7.

[Preparation of Display Elements 8-13]

(Preparation of Electrolyte Liquid)

<Preparation of Electrolyte Liquid 3>

Into 2.5 g of propylene carbonate/ethylene carbonate (mass ratio 7/3), 100 mg of silver p-toluenesulfonate, 150 mg of 3,6-dithia-1,8-octanediol 1 mg of mercapto triazole were fully dissolved, and 150 mg of polyvinyl alcohol was added. The resulting mixture was stirred for one hour while heated at 120° C., whereby Electrolyte liquid 3 was obtained.

<Preparation of Electrolyte Liquid 4>

Electrolyte liquid 4 was prepared in the same manner as Electrolyte liquid 3, except that dimethyl sulfoxide was used instead of propylene carbonate/ethylene carbonate.

<Preparation of Electrolyte Liquid 5>

Electrolyte liquid 5 was prepared in the same manner as Electrolyte liquid 4, except that 3,6-dithia-1,8-octanediol was not used and the amount of mercaptotriazole was changed to 300 mg.

<Preparation of Electrolyte Liquid 6>

Electrolyte liquid 6 was prepared in the same manner as Electrolyte liquid 4, except that mercaptotriazole was not used.

<Preparation of Electrolyte Liquid 7>

Electrolyte liquid 7 was prepared in the same manner as Electrolyte liquid 3, except that silver bromide was used instead of silver p-toluenesulfonate.

<Preparation of Electrolyte Liquid 8>

Electrolyte liquid 8 was prepared in the same manner as Electrolyte liquid 3, except that silver chloride was used instead of silver p-toluenesulfonate.

(Preparation of Display Element)

Display Elements 8-13 were prepared in the same manner as Display Element 6, except that Electrolyte liquids 3-8 were used, respectively, instead of Electrolyte liquid 2.

<<Evaluation of Display Element>>

(Driving Method)

Using a well known passive matrix driving circuit, dissolution—deposition reaction of silver in the electrolyte was carried out with an electricity of 5 mC/cm$^2$ per pixel to switch white display (dissolution state of silver) and black display (deposit state of silver).

(Evaluation 1)

Using a well known passive matrix driving circuit, inversion was repeated between the electrodes with an electricity of 5 mC/cm$^2$ per pixel at applying voltage of 1.5 V. It was found that a reversible inversion of white display and black display was possible in each of Display elements 1-13, and that a porous layer was formed in each of Display elements 8-13.

(Evaluation 2)

Reflectance W1 which is a reflectance of white display at 550 nm was determined using a spectrophotometer CM-3700d produced by Konica Minolta Sensing Inc. Next, Display element 1 was stored under the condition of 55° C. and relative humidity of 40% for 1 week, and a reflectance of white display at 550 nm W2 was determined. Then, reflectance ratio W2/W1 was obtained.

The same evaluation was carried out for each of Display elements 2-13, and a relative value of W1 (the relative value of W1 was obtained by normalizing the W1 of Display element 1 as W1=1) and W2/W1 of each display element were compared. A larger value of W1 means that reflectance of white display is higher, and a closer W2/W1 value to 1 means that variation of reflectance of white display is small.

The results obtained as above were shown in Table 1.

TABLE 1

| Display element No. | Results of evaluation | | Remarks |
|---|---|---|---|
| | Relative value of W1 | W2/W1 | |
| 1 | 1.00 | 0.79 | Comparative |
| 2 | 0.71 | 0.81 | Comparative |
| 3 | 1.05 | 0.85 | Inventive |
| 4 | 1.13 | 0.88 | Inventive |
| 5 | 1.16 | 0.89 | Inventive |
| 6 | 1.14 | 0.92 | Inventive |
| 7 | 1.15 | 0.93 | Inventive |
| 8 | 1.17 | 1.00 | Inventive |
| 9 | 1.13 | 0.97 | Inventive |
| 10 | 1.14 | 0.95 | Inventive |
| 11 | 1.15 | 0.96 | Inventive |
| 12 | 1.16 | 0.91 | Inventive |
| 13 | 1.15 | 0.93 | Inventive |

As shown in Table 1, Display Elements 3-13 each having the construction prescribed in the present invention showed higher reflectance of white display and smaller variation of reflectance of white display compared to those obtained for comparative samples.

What is claimed is:

1. A display element comprising opposed electrodes having therebetween:
   an electrolyte layer comprising an electrolyte solvent, and silver or a compound comprising silver in the chemical structure; and
   a porous-white scattering material provided on at least one of the opposed electrodes,
   the display element being driven by a driving operation so as to dissolve silver or to deposit silver by using the opposed electrodes,
   wherein the porous-white scattering material comprises white pigment particles fixed with each other with a water soluble polymer that is substantially insoluble in the electrolyte solvent; and the electrolyte layer comprises at least one compound represented by Formula (3) or Formula (4):

$R_7-S-R_8$  Formula (3)

wherein $R_7$ and $R_8$ each represent a substituted or unsubstituted hydrocarbon group, provided that $R_7$ and $R_8$ may be combined to form a ring, and, when a ring containing S is formed, no aromatic group is contained, Formula (4)

wherein M represents a hydrogen atom, a metal atom or a quarternary ammonium Z represents a nitrogen-containing heterocycle; n represents an integer of 0 to 5; $R_9$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoylgroup, a cyano group, an alkylsulfonyl group, an arylsulfonyl group, an alkoxycarbonyl group, the aryloxycarbonyl group, an alkylcarbonyl group, an arylcarbonyl group, an acyloxy group, a carboxyl group, a carbonyl group, a sulfonyl group, an amino group, a hydroxy group, or a heterocycle group; and when n is an integer of two or more, each $R_9$ may be the same or different, and each $R_9$ may be combined to form a condensed ring.

2. The display element of claim 1, wherein the water-soluble polymer is gelatin, a gelatin derivative, polyvinyl alcohol or a polyvinyl alcohol derivative.

3. The display element of claim 1, wherein a hardening reaction of the water-soluble polymer is carried out using a hardening agent during the step of drying the aqueous mixture or after the step of drying the aqueous mixture.

4. The display element of claim 1, wherein the electrolyte layer further comprises at least one compound represented by Formula (1) or Formula (2):

Formula (1)

wherein L represents an oxygen atom or $CH_2$, $R_1$-$R_4$ each represent a hydrogen atom, an alkyl group, an alkenyl group, an aryl group, a cycloalkyl group, an alkoxyalkyl group or an alkoxy group, and Formula (2)

wherein $R_5$ and $R_6$ each represent a hydrogen atom, an alkyl group, an alkenyl group, an aryl group, a cycloalkyl group, an alkoxyalkyl group or an alkoxy group.

5. The display element of claim 1, wherein the display element satisfies Condition (1):

$0 \leq [X]/[Ag] \leq 0.01$  Condition (1)

wherein:
   [X](mole/kg) represents a molar content of halogen ions or halogen atoms comprised in the electrolyte layer; and
   [Ag] (mole/kg) represents a total molar content of silver or silver contained in the compound comprising silver in the chemical structure, comprised in the electrolyte layer.

6. The display element of claim 1, wherein the driving operation comprises an operation to deposit blackened silver at a potential higher than an overpotential and an operation to continue depositing the blackened silver at a potential lower than the overpotential.

* * * * *